United States Patent Office 3,317,538
Patented May 2, 1967

3,317,538
4,4'-DIAMINO-BUTYROPHENONES
Meier E. Freed, Philadelphia, and Elisabeth Hertz, Bryn Mawr, Pa., assignors to American Home Products Corporation, New York, N.Y., a corporation of Delaware
No Drawing. Filed Oct. 22, 1965, Ser. No. 502,641
6 Claims. (Cl. 260—268)

This invention relates to aryl-alkyl ketones and particularly to disubstituted butyrophenones having useful pharmacological activity.

The compounds of the invention may be illustrated by the following structural formula:

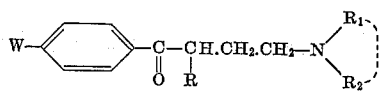

In the above formula R may be either hydrogen or methyl while W is intended to represent a piperidino or a piperazino radical, a phenyl or morpholine-(lower)alkylamino radical, an amino-(lower)alkylamino radical, an amino-(lower)alkylmercapto or an amino-(lower)alkoxy radical. In the 4-position, the amino radical, represented by

may be either a di-(lower)alkylamino or a piperidino radical, preferably dimethylpiperidino.

Pharmacological tests have demonstrated the compounds to possess central nervous system activity and particularly a sedative action. Additionally, a substantial group of compounds show an anticonvulsant action.

The compounds sought to be patented are generally used in the form of pharmaceutically acceptable, acid-addition salts which are prepared in known manner from the base by reaction with a suitable mineral acid, for example hydrochloric or phosphoric acid, or an organic acid such as acetic, succinic, fumaric, maleic, tartaric acid or the like. The compounds in this form are solids having substantial water solubility.

The preparation of the compounds falling within the scope of the invention is carried out by reacting a selected 4-aminosubstituted-p-halobutyrophenone with an amine in a suitable non-reactive solvent, a particularly useful one being dimethyl sulfoxide. An acid acceptor, for example, potassium carbonate may be present during the reaction which is carried out at a temperature in the range of about 35° to 150° C., generally from about 100° to 130° C.

An alternative procedure involves the reaction of a selected 4-aminosubstituted-p-halobutyrophenone or an equivalent compound with dimethylamine ethanol or aminomercaptan in dimethylsulfoxide or equivalent solvent. In this case the dimethylaminoethanol or aminomercaptan is first reacted with sodium, preferably as sodium hydride. After the addition of the sodium moiety, the butyrophenone compound is then added. The reaction conditions are similar to that described above.

The following examples are intended to illustrate the invention in more specific detail.

EXAMPLE I

*dl-4-dimethylamino-4'-(α-methylphenethylamino)-butyrophenone*

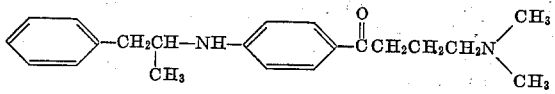

A solution of 4-dimethylamino-p-fluorobutyrophenone (10.47 g., 0.05 mole), amphetamine (15.0 g., 0.11 mole) and dimethyl sulfoxide (60 ml.) was heated at 130° C. for 23½ hours. The reaction mixture was cooled, poured into water (1500 ml.) and extracted with ether (4 portions, 250 ml. each). The ethereal extracts were washed with saturated sodium chloride solution, then extracted with 20% HCl (3 portions, 250 ml. each). The aqueous acid extracts were made strongly basic with excess 50% sodium hydroxide and extracted with ether (4 portions, 250 ml. each). The ethereal extracts were washed with saturated sodium chloride solution and dried over anhydrous magnesium sulfate. The solvent was removed by distillation and the residue distilled, collecting the fraction boiling at 218–225° C. at 0.1 mm., 6.2 g., 38.2% yield.

The hemi-fumarate was prepared by adding an acetone solution of the base to a solution of fumaric acid in acetone and recrystallizing the salt once from actone and three times from acetonitrile to give a solid melting at 164–165° C.

*Analysis.*—Calculated for $C_{23}H_{30}N_2O_3$: 72.22% C, 7.91% H, 7.32% N. Found: 72.16% C, 7.61% H, 7.21% N.

EXAMPLE 2

*4-(dimethylamino)-4'-piperidinobutyrophenone*

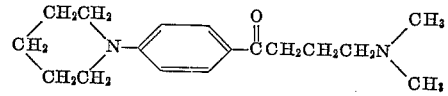

A mixture of 4-dimethylamino-p-fluorobutyrophenone (10.47 g., 0.05 mole), piperidine (4.26 g., 0.05 mole), anhydrous potassium carbonate (6.92 g., 0.05 mole) and dimethyl sulfoxide (15 ml.) was heated on the steambath for 26 hours. The mixture was poured into water (1 l.). The resulting oil was extracted with ether (4 portions, 100 ml. each) and the ethereal extracts were combined and washed with saturated sodium chloride solution. The ethereal solution was extracted with 10% hydrochloric acid (4 portions, 200 ml. each). The aqueous acid extracts were combined, made strongly basic with excess 50% aqueous sodium hydroxide solution and extracted with ether (4 portions, 200 ml. each). The ether extracts were combined, washed with saturated sodium chloride solution and dried over anhydrous magnesium sulfate. The solvent was removed and the residue distilled, collecting the fraction boiling at 190–192° C. at 0.05 mm., 9.1 g., $n_D^{25}$ 1.5830, 66.3% yield.

*Analysis.*—Calculated for $C_{17}H_{26}N_2O$: 74.41% C, 9.55% H, 10.21% N. Found: 74.05% C, 9.33% H, 10.36% N.

The dihydrochloride was prepared from an ethereal solution of the base by treatment with anhydrous hydrogen chloride. After two recrystallizations from ethanol-acetone, the hydrochloride melted at 225–229° C.

*Analysis.*—Calculated for $C_{17}H_{28}Cl_2N_2O$: 58.82% C, 8.12% H, 20.42% Cl, 8.07% N. Found: 58.76% C, 8.01% H, 20.1% Cl, 7.98% N.

EXAMPLE 3

*4-(4,4-dimethylpiperidino)-4'-(4methyl-1-piperazinyl) butyrophenone*

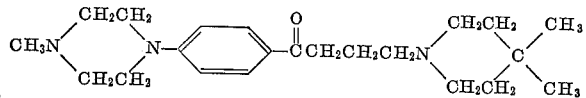

A mixture of 4-(4,4-dimethylpiperidino)-p-fluorobutyrophenone (13.87 g., 0.05 mole), N-methylpiperazine (5.01 g., 0.05 mole), anhydrous potassium carbonate (6.92 g., 0.05 mole) and dimethyl sulfoxide (15 ml.) was heated on the steambath for 7¼ hours. The reaction mixture was cooled and poured into water (1 l.). An oil formed which solidified on chilling. This solid was filtered off, washed and dried to yield the crude product, 14.1 g.

A portion of the crude product (11.1 g.) was purified via the hydrochloride by treatment of its ethereal solution with anhydrous hydrogen chloride, recrystallizing the salt twice from methanol-acetone, and recovering the base by treatment of an aqueous solution of the salt with 50% aqueous sodium hydroxide, extraction with ether and concentrating the dried ethereal extracts. This gave the product, 4.3 g., melting at 72–74° C. (30.6% yield). A sample of this material was recrystallized from petroleum ether to give a solid melting at 75–76.5° C.

*Analysis.*—Calculated for $C_{22}H_{35}N_3O$: 73.90%, C, 9.87% H, 11.75% N. Found: 73.78% C, 9.84% H, 12.02% N.

The trihydrochloride was prepared from an ethereal solution of the base by treatment with anhydrous hydrogen chloride. It melted at 283–283.5° C.

*Analysis.*—Calculated for $C_{22}H_{38}Cl_3N_3O$: 56.56% C, 8.20% H, 22.78% Cl, 8.99% N. Found: 56.22% C, 7.95%, H, 22.65%, Cl, 8.81% N.

EXAMPLE 4

*4-(dimethylamino)-4'-[[2-(dimethylamino)ethyl]amino)butyrophenone*

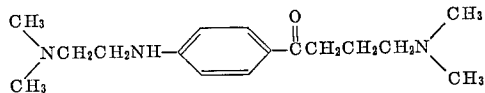

A mixture of 4-dimethylamino-p-fluorobutyrophenone (10.47 g., 0.05 mole), dimethylaminoethylamine (4.41 g., 0.05 mole), anhydrous potassium carbonate (6.92 g., 0.05 mole) and dimethyl sulfoxide (35 ml.) was heated on the steambath for 43½ hours. The mixture was poured into water (1 l.) and extracted with ether (4 portions, 250 ml. each). The ethereal extracts were combined, washed with saturated sodium chloride solution and extracted with 20% hydrochloric acid (3 portions, 250 ml. each). The aqueous acid extracts were made strongly basic with excess 50% sodium hydroxide and extracted with ether (4 portions, 250 ml. each). The ethereal extracts were combined, washed with saturated sodium chloride solution, and dried over anhydrous magnesium sulfate. The solvent was removed and the residue distilled, collecting the fraction boiling at 190–195° C. at 0.05 mm., 3.2 gm. (23.2% yield). The base was converted to the dihydrochloride by treating its ethereal solution with anhydrous hydrogen chloride. The salt was recrystallized twice from ethanol to give 2.75 g. solid, melting at 232.5–234° C.

*Analysis.*—Calculated for $C_{16}H_{29}Cl_2N_3O$: 54.87% C, 8.35% H, 20.22% Cl, 11.99% N. Found: 54.67% C, 8.57% H, 20.2% Cl, 12.11% N.

EXAMPLE 5

*4'-([3-(dimethylamino)propyl]amino)-4-(4,4-dimethylpiperidino)butyrophenone*

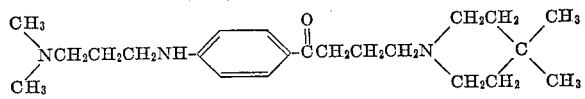

A solution of 4-(4,4-dimethylpiperidino)-p-fluorobutyrophenone (13.87 g., 0.05 mole), 3-dimethylaminopropylamine (10.3 g., 0.1 mole) and dimethylsulfoxide (60 ml.) was heated at 130° C. for 23 hours. The reaction mixture was cooled and poured into water (1 l.). The gum that was formed was extracted with ether (1 portion, 500 ml. and 4 portions, 250 ml. each). The ethereal extracts were combined, washed with saturated sodium chloride solution and extracted with 10% HCl (4 portions, 250 ml. each). The aqueous acid extracts were made strongly basic with excess 50% sodium hydroxide and extracted with ether (4 portions, 250 ml. each). The ethereal extracts were washed with saturated sodium chloride and dried over anhydrous magnesium sulfate. The solvent was removed and the residue distilled, collecting the fraction boiling at 205 to 228° C. at 0.1 mm., 12.9 g. (71.7% yield). A sample of the product was recrystallized twice from petroleum ether to give a solid melting at 66–68° C.

*Analysis.*—Calculated for $C_{22}H_{37}N_3O$: 73.49% C, 10.37% H, 11.69% N. Found: 73.82% C, 10.24% H, 11.65% N.

The base was converted to the dihydrochloride by treating its ethereal solution with anhydrous hydrogen chloride and recrystallizing twice from ethanol to give a solid melting at 268–269° C.

*Analysis.*—Calculated for $C_{22}H_{39}Cl_2N_3O$: 61.10% C, 9.09% H, 16.39% Cl, 9.62% N. Found: 60.85% C, 9.20% H, 16.3% Cl, 9.63% N.

EXAMPLE 6

*4-(diethylamino)-4'-[(2-morpholinoethyl)amino]butyrophenone*

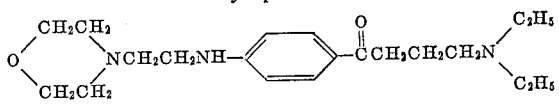

A solution of 4-diethylamino-p-fluorobutyrophenone (11.87 g., 0.05 mole) morpholinoethylamine (13.02 g., 0.1 mole) and dimethyl sulfoxide (60 ml.) was heated at 130° C. for 24 hours. The reaction mixture was cooled and poured into water (1500 ml.) and extracted with ether. The ethereal extracts were combined and washed with saturated sodium chloride solution, then extracted with 10% hydrochloric acid (4 portions, 250 ml. each). The aqueous acid extracts were combined, made strongly basic with excess 50% sodium hydroxide, and extracted with ether (5 portions, 250 ml. each). The ethereal extracts were combined, washed with saturated sodium chloride solution and dried over anhydrous magnesium sulfate. The solvent was removed by distillation and the residue distilled, collecting the fraction boiling at 238 to 245° C. at 0.25 mm., 8.9 g., 51.2% yield.

*Analysis.*—Calculated for $C_{20}H_{33}N_3O_2$: 69.12% C, 9.57% H, 12.09% N. Found: 69.13% C, 9.30% H, 12.16% N.

The base was converted to the dihydrochloride by treating its ethereal solution with anhydrous hydrogen chloride and recrystallizing twice from ethanol to give a solid melting at 223–224° C.

*Analysis.*—Calculated for $C_{20}H_{35}Cl_2N_3O_2$: 57.13% C, 8.39% H, 16.86% Cl, 9.99% N. Found: 57.35% C, 8.64% H, 17.2% Cl, 9.85% N.

EXAMPLE 7

*4-dimethylamino-4'-(3-dibutylaminopropoxy)-butyrophenone*

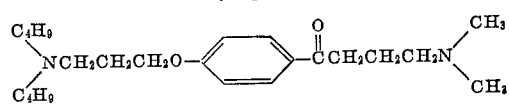

Sodium hydride (2.26 g., 0.05 mole, of a 53.3% dispersion in mineral oil) was added rapidly in small portions to a solution of 3-di-n-butylamine-1-propanol (11.24 g., 0.06 mole) in dimethyl sulfoxide (40 ml.). A slight exotherm resulted. The mixture was stirred for 1½ hours at room tempearture. The mixture was heated to 40° C. and 4-dimethylamino-p-fluorobutyrophenone (8.29 g., 0.04 mole) in dimethyl sulfoxide (10 ml.) was added dropwise at about 40° C. The resulting exotherm maintained the temperature at 40° C. during the addition. The reaction mixture was stirred and heated at 40° C. for 3¼ hours after the addition had been completed. The mixture was cooled, poured into water (1 l.) and extracted with ether (1 portion of 500 ml. and 3 portions, 250 ml. each). The ethereal extracts were combined, washed with saturated sodium chloride solution and extracted with 20% hydrochloric acid (4 portions, 250 ml. each). The aqueous acid extracts were combined, made strongly basic with excess 50% sodium hydroxide, and extracted with ether (1 portion of 500 ml. and 3 portions, 250 ml. each). The ethereal extracts were combined, washed with saturated sodium chloride solution and dried over anhydrous magnesium sulfate. The solvent was removed by distillation and the residue distilled, collecting the fraction boiling at 198–205° C. at 0.1 mm., 10.8 g., $n_D^{24.5}$ 1.5087, 71.7% yield.

*Analysis.*—Calculated for $C_{23}H_{40}N_2O_2$: 73.35% C, 10.71% H, 7.44% N. Found: 73.05% C, 10.53% H, 7.57% N.

The dihydrochloride was prepared by treating the alcoholic solution of the base with an alcoholic solution of hydrogen chloride and precipitating with ether. The solid was recrystallized twice from ethanol-ether to give the hemi-hydrate, melting at 105–110° C.

*Analysis.* — Calculated for $C_{23}H_{42}Cl_2N_2O_2 \cdot \frac{1}{2}H_2O$: 60.28% C, 9.45% H, 15.46% Cl, 6.11% N. Found: 60.46% C, 9.06% H, 15.45% Cl, 6.25% N.

EXAMPLE 8

*4-[4,4-dimethylpiperidino]-4'-[2-dimethylaminoethoxy] butyrophenone*

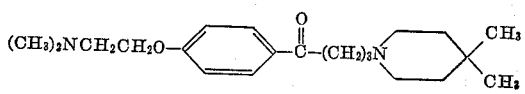

To a solution of dimethylaminoethanol (1.8 g., 0.02 mole) in 25 ml. of dimethylsulfoxide was added sodium hydride (dispersion in mineral oil, 10 g. of 52% hydride). The resultant mixture was warmed to 40° and a solution of 4-(4,4-dimethyl) piperidino-4′ - fluorobutyrophenone (5.0 g., 0.018 mole) in 25 ml. of dimethylsulfoxide was added. The temperature rose to 70° and a deep orange-red color formed. The reaction was stirred 1 hour further at room temperature, then 3 hours with heating to 45°. After cooling, the reaction mixture was poured into water (300 ml.) and extracted with ether. The extract was washed with water, dried over sodium sulfate, and filtered. After removing the ether, the residue was distilled under vacuum. The product distilling at 183–188°/.07 mm. was collected. Obtained 3.8 g. (61%).

*Analysis.*—Calculated for $C_{21}H_{34}N_2O_2$: C, 72.79; H, 9.89; N, 8.09%. Found: C, 72.72; H, 9.93; N, 7.82%.

The dihydrochloride was prepared in the usual manner; after recrystallization from ethanol it melted 270–272°.

*Analysis.*—Calculated for $C_{21}H_{36}Cl_2N_2O_2$: C, 60.18; H, 8.62; Cl, 16.92; N, 6.68%. Found: C, 59.96; H, 8.48; Cl, 16.90; N, 6.78%.

In the same manner as described in this example, one may replace the dimethylaminoethanol with diethylaminoethylthiol and carry out the reaction as indicated. The compound thus produced would be 4-diethylamino-4′-[2-(diethylamino)ethylmercapto]butyrophenone.

EXAMPLE 9

*4-[diethylamino]-4'-[3-(diethylamino)propoxy]-butyrophenone*

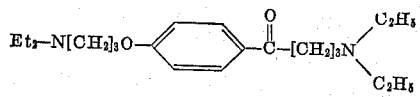

In the same manner as described for Example 8 diethylaminopropanol was treated with sodium hydride in dimethylsulfoxide and to the resultant solution was added 4-diethylamino-4′-fluorobutyrophenone. The product was distilled; B.P. 175–180°/0.1 mm. (55.8% yield). The hydrochloride salt was prepared and recrystallized from ethanol-ether. M.P. 164–165°.

*Analysis.*—Calculated for $C_{21}H_{38}Cl_2N_2O_2$: C, 59.85; H, 9.09; Cl, 16.82; N, 6.65%. Found: C, 60.10; H, 9.10; Cl, 17.00; N, 6.59%.

Following this procedure, but reacting diethylaminopropanol with sodium hydride in dimethylsulfoxide and then adding 4-diethylamino - 2 - methyl-4′-fluorobutyrophenone in place of the butyrphenone above mentioned, one obtains 4-[diethylamino] - 2 - methyl-4′-[3-(diethylamino)propoxy]butyrophenone While the above examples specifically illustrate forming specific salts, other non-toxic acid addition salts are contemplated as indicated previously, and these may be prepared by well-known means using the desired acidic reactant.

In utilizing the compounds for their pharmacological effect, dosage ranges of the order of from about 10 to about 100 mg. per kilogram of body weight would be used. The active ingredient may be combined with suitable extenders, excipients or carrier agents for solid or liquid dosage forms.

The invention being claimed is:

1. A disubstituted butyrophenone having the formula:

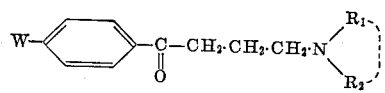

wherein W represents a member selected from the group consisting of piperidino, lower alkylpiperazino, phenyl (lower) alkylamino, di-(lower) alkylamino-(lower) alkylamino, morpholino-(lower) alkylamino, and di-(lower) alkylamino-(lower) alkoxy, while

represents a member selected from the group consisting of N,N-di-lower) alkylamino and di-(lower) alkyl-piperidino.

2. dl - 4 - dimethylamino - 4′ - (α-methylphenethylamino)butyrophenone.

3. 4-(dimethylamino)-4′-piperidinobutyrophenone.

4. 4-(4,4-dimethylpiperidino) - 4′ - (4-methyl - 1 - piperazinyl)butyrophenone.

5. 4 - (dimethylamino) - 4′ - ([2 - dimethylamino)-ethyl]amino)butyrophenone.

6. 4′-([3-(dimethylamino)propyl]amino) - 4 - (4,4-dimethylpiperidino)butyrophenone.

No references cited.

ALEX MAZEL, *Primary Examiner.*

HENRY R. JILES, *Examiner.*

RAY BOYD, *Assistant Examiner.*